(12) United States Patent
Neto

(10) Patent No.: US 7,753,592 B2
(45) Date of Patent: Jul. 13, 2010

(54) BEARING CAP WITH WEIGHT REDUCTION FEATURES

(75) Inventor: Jose Correa Neto, Rochester, MI (US)

(73) Assignee: Metaldyne Corporation, Plymouth, MI (US)

(*) Notice: Subject to any disclaimer, the term of this patent is extended or adjusted under 35 U.S.C. 154(b) by 919 days.

(21) Appl. No.: 11/520,322

(22) Filed: Sep. 13, 2006

(65) Prior Publication Data
US 2007/0081750 A1    Apr. 12, 2007

Related U.S. Application Data

(60) Provisional application No. 60/716,774, filed on Sep. 13, 2005.

(51) Int. Cl.
*F16C 17/02* (2006.01)
*F16C 33/02* (2006.01)
(52) U.S. Cl. .................. 384/432; 384/293; 384/434
(58) Field of Classification Search ................ 384/273, 384/294, 432–434
See application file for complete search history.

(56) References Cited

U.S. PATENT DOCUMENTS

| | | | |
|---|---|---|---|
| 4,520,771 A | | 6/1985 | Hayashi |
| 4,705,092 A | | 11/1987 | Ito et al. |
| 5,509,387 A | * | 4/1996 | Kaminski et al. ........... 384/432 |
| 5,535,643 A | * | 7/1996 | Garza ........................... 74/603 |
| 6,086,258 A | * | 7/2000 | Cadle et al. .................. 384/294 |
| 6,382,165 B1 | * | 5/2002 | Hirose et al. ............. 123/192.2 |
| 6,666,582 B2 | * | 12/2003 | Benini et al. ................. 384/434 |
| 2003/0118260 A1 | * | 6/2003 | Suzuki ......................... 384/432 |
| 2004/0240762 A1 | * | 12/2004 | Cadle et al. .................. 384/432 |

FOREIGN PATENT DOCUMENTS

| EP | 1808607 A1 | * | 7/2007 |
|---|---|---|---|
| JP | 11-280752 A | * | 10/1999 |
| JP | 2003041302 A | * | 2/2003 |

OTHER PUBLICATIONS

International Search Rpt., Mar. 2, 2007, Metaldyne.

* cited by examiner

*Primary Examiner*—Marcus Charles
(74) *Attorney, Agent, or Firm*—McDonald Hopkins LLC

(57) ABSTRACT

Bearing caps and methods for manufacturing bearing cap are disclosed. Bearing cap includes a body that comprises an abutment surface, a bearing surface, an exterior surface, and a recess portion. The abutment surface provides for the bearing cap to be coupled to an engine along a flat and even surface. The bearing surface provides for the bearing cap to at least partially capture the bearing shaft to secure the bearing shaft when the bearing cap is abutted to the engine. The recess portion extends into the body of the bearing cap from the exterior surface to reduce the weight of the bearing cap. The recess portion can be located anywhere along the exterior surface and be any shape and dimension that retains sufficient structural integrity of the bearing cap to secure the balance shaft to the engine.

10 Claims, 5 Drawing Sheets

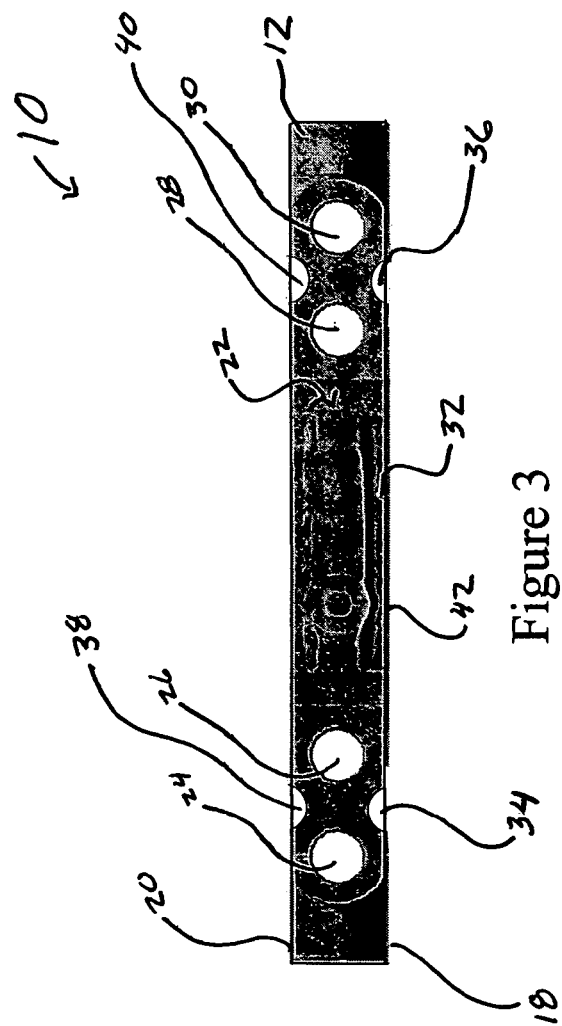
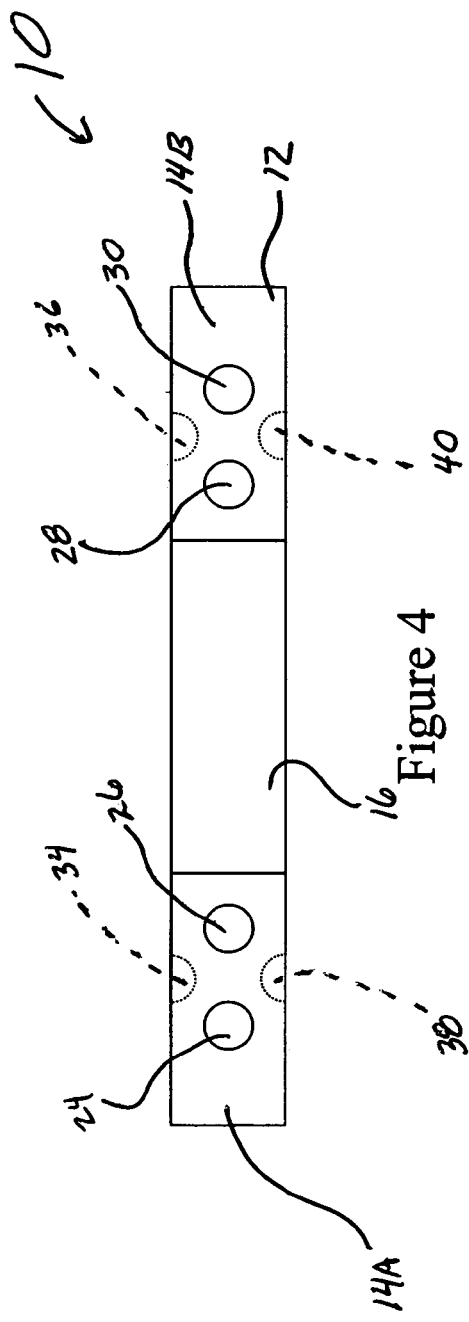
Figure 3
Figure 4

BEARING CAP WITH WEIGHT REDUCTION FEATURES

RELATED APPLICATIONS

This non-provisional application claims the benefit of U.S. Provisional Patent Application No. 60/716,774, entitled "BEARING CAP WITH WEIGHT RESUCTION FEATURE," filed Sep. 13, 2005, which is hereby incorporated by reference in its entirety.

FIELD OF INVENTION

The present invention relates generally to engine components and their manufacture, and relates particularly to a bearing cap with features that reduce the weight of the bearing cap.

BACKGROUND

In reciprocating piston engines, vibrational forces are produced due to the movement and mass of reciprocating parts. To offset such vibrational forces, engines are often equipped with balance shafts, which include balancing weights. Such balancing weights act to counterbalance and offset vibrational forces produced by reciprocal parts during the operation of the engine. Typical reciprocal engines often utilize pairs of balance shafts. Such pairs of balance shafts are supported on casings disposed in an oil pan below the engine cylinder block. The balance shafts are linked to each other and a to an engine crankshaft to transfer the rotational forces from the crankshaft to the balance shafts. Balance shafts are typically linked to the crankshaft via a chain, belt, or the like, such that the balance shafts rotate at twice the rotational speed and in the opposite direction of the crankshaft. The resultant vibrational forces of the balance shafts counterbalance and offset the vibrational forces of the engine.

In general, such balance shafts are supported at a plurality of positions to secure the balance shafts to the engine. Since a substantial amount of balancing torque is produced when the balance shafts rotate, the shafts must be supported by a sufficiently rigid bearing structure to remain secured to the engine during operation of the engine. Typically, balance shafts are supported and secured by bearing caps having journal portions designed to capture a portion of the balance shaft. Bearing caps known in the art are generally solid bodies fabricated from cast iron and split into upper and lower halves, as disclosed in U.S. Pat. No. 5,535,643.

As is known in the art, one method of increasing the strength of the journal portion is to manufacture bearing caps from billet steel or other such rigid material through a casting or machining process. Secondary operations often accompany such processes, such as the drilling of journal portions through the cast or machined bearing cap. The journal portions are drilled to accommodate the insertion of the balance shafts into the journal portions.

There is a constant need in the art to reduce the weight of automotive components, increase the strength and machinability of such components, and reduce costs. Any such improvements are constantly sought in the automotive industry.

SUMMARY OF INVENTION

These needs and others are addressed by the invention disclosed herein. An apparatus and methods are provided for reducing the weight of a bearing cap. Such bearing caps are utilized for securing a balance shaft to an engine. Methods and features for reducing the weight of a bearing cap retain the structural integrity of the bearing cap. The apparatus and methods further provide for cost reductions by limiting the amount of post-forming machining needed to finish a bearing cap.

As such, an apparatus for a bearing cap is disclosed herein. The bearing cap includes a body that comprises an abutment surface, a bearing surface, an exterior surface, and a recess portion. The abutment surface provides for the bearing cap to be coupled to an engine along a flat and even surface. The bearing surface provides for the bearing cap to at least partially capture the bearing shaft to secure the bearing shaft when the bearing cap is abutted to the engine. The recess portion extends into the body of the bearing cap from the exterior surface to reduce the weight of the bearing cap. The recess portion can be located anywhere along the exterior surface and be any shape and dimension that provides sufficient structural integrity to the bearing cap for securing the balance shaft to the engine.

Furthermore, a method for forming a bearing cap is disclosed herein. The bearing cap is formed in a mold. The mold includes a cavity into which material is place. A die is used to compress the material in the cavity to form the bearing cap. A protrusion in the cavity produces a recess in a portion of the bearing cap. Such recess reduces the weight of the bearing cap. In addition, a contact surface of the die may form an abutment surface of the bearing cap.

BRIEF DESCRIPTION OF THE DRAWING

In the accompanying drawings, which are incorporated in and constitute a part of this specification, embodiments of the invention are illustrated, which, together with a general description of the invention given above, and the detailed description given below serve to illustrate the principles of this invention. The drawings and detailed description are not intended to and do not limit the scope of the invention or the claims in any way. Instead, the drawings and detailed description only describe embodiments of the invention and other embodiments of the invention not described are encompassed by the claims.

FIG. 3 is a top plan view of the bearing cap of FIG. 1;

FIG. 4 is a bottom plan view of the bearing cap of FIG. 1;

DETAILED DESCRIPTION OF THE INVENTION

This invention and disclosure are directed to apparatus and methods for providing a bearing cap for securing a balance shaft to an engine. Such bearing caps include features that reduce the weight of bearing caps. Such features include recesses extending into the bearing cap from exterior surfaces of bearing caps. Such features are arranged such that the structural integrity of the bearing cap is not compromised with regard to securing the balance shaft to the engine.

Figure 1:
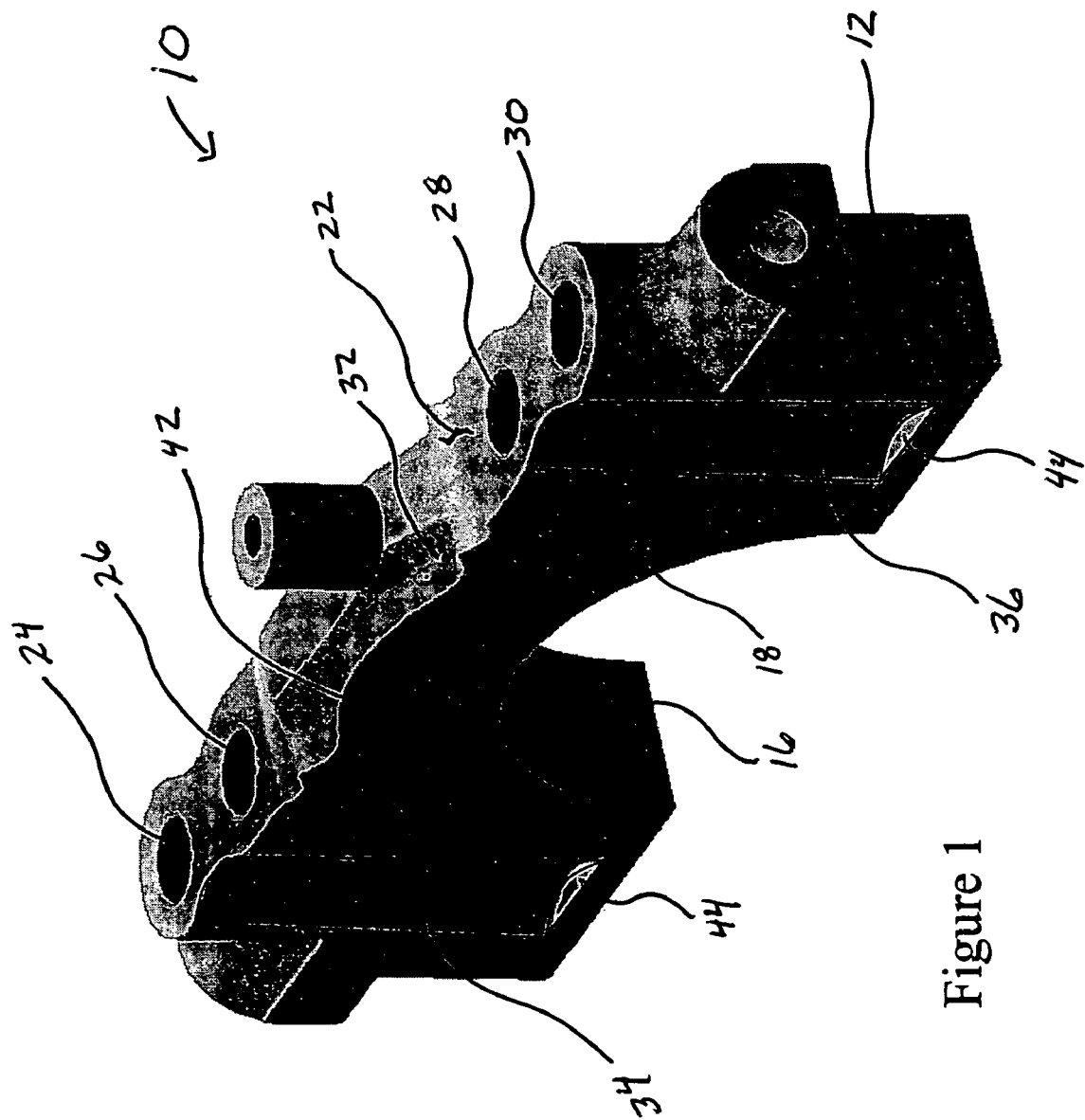
FIG. 1 is a perspective view of a bearing cap arranged in accordance with an embodiment of the present invention.
Figure 2:
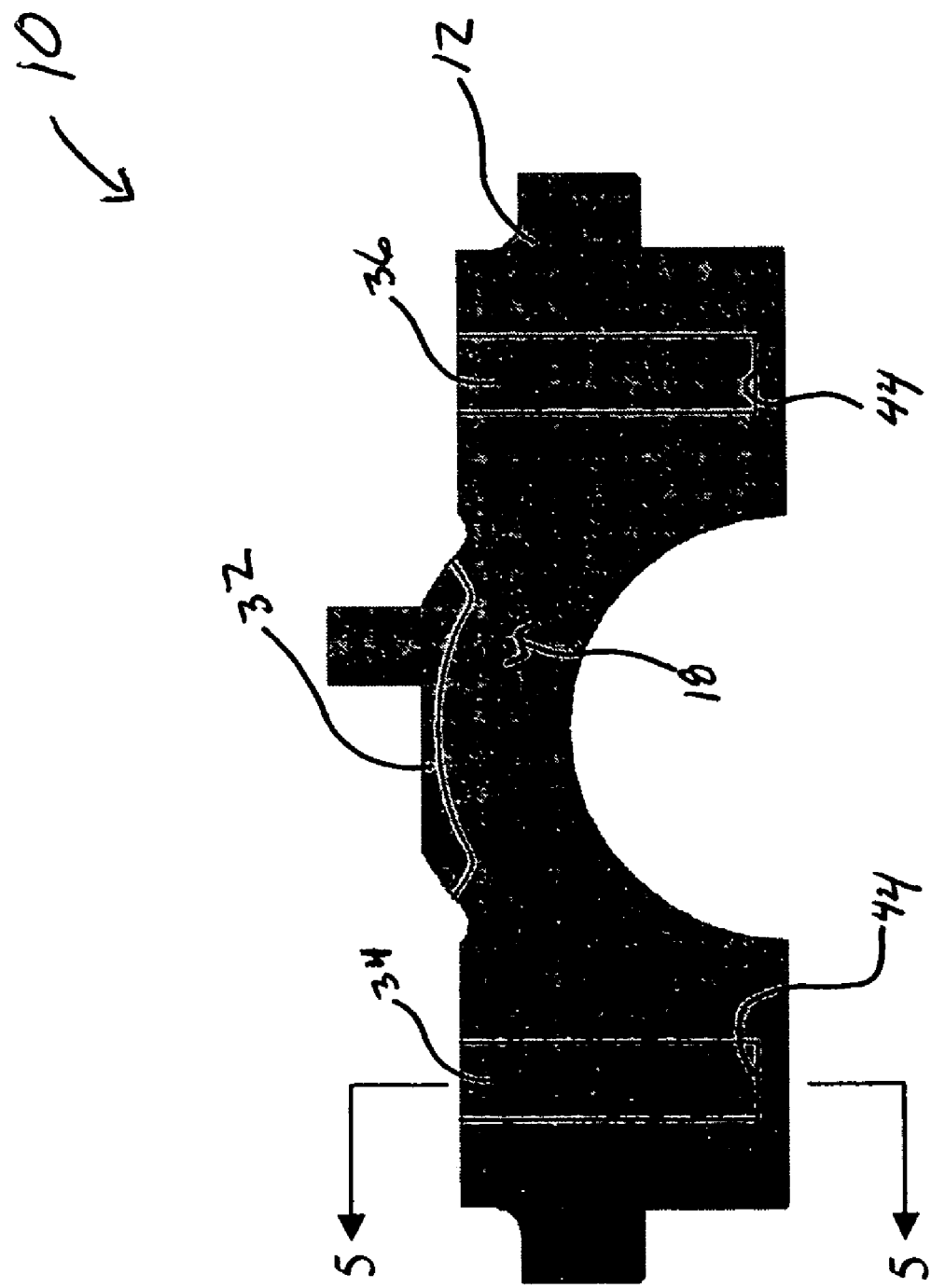
FIG. 2 is a front elevational view of the bearing cap of FIG. 1.
Figure 5:
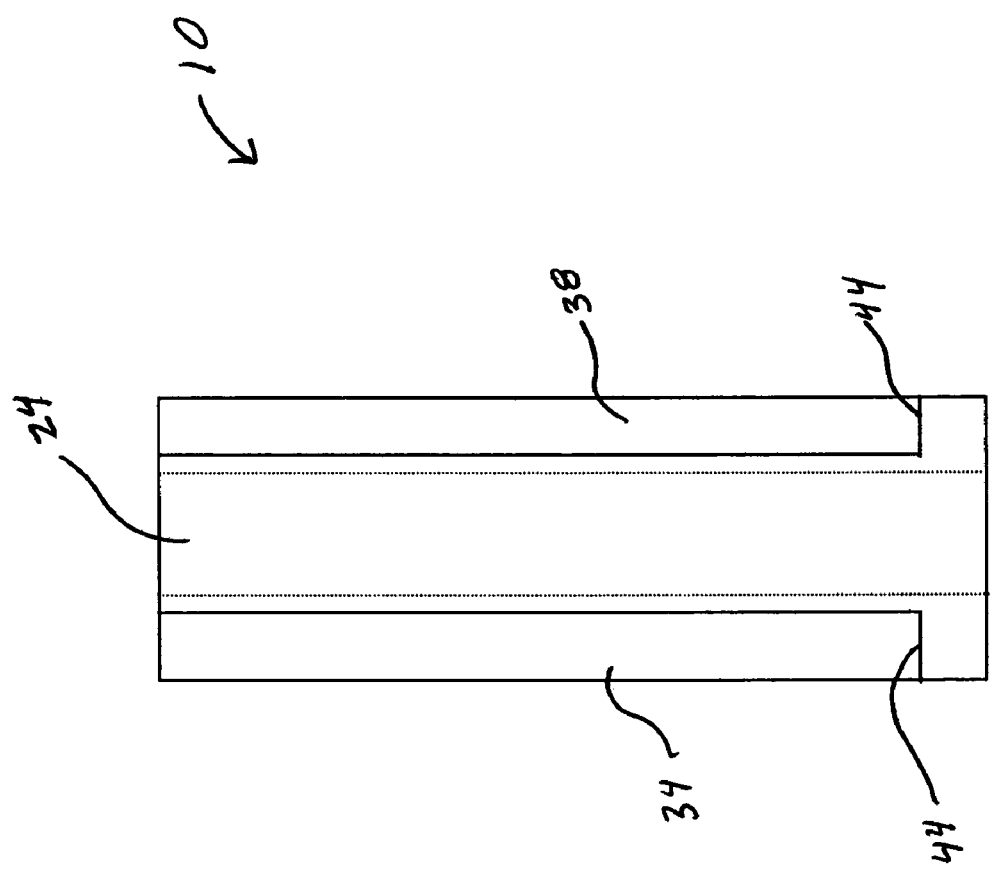
FIG. 5 is a cross-sectional view of the bearing cap of FIG. 1 taken along the line 5-5 of FIG. 2.

An exemplary bearing cap 10 in accordance with an embodiment of the invention is illustrated in FIGS. 1 though 5. The bearing cap 10 includes a body 12 formed from metal or other such rigid material. The body 10 includes abutment surfaces 14A and 14B (best seen in FIG. 4), a bearing surface 16, and a plurality of exterior surfaces. As illustrated in the figures, the exemplary embodiment includes a pair of side surfaces 18 and 20 and a top surface 22.

Additionally, the bearing cap 10 includes four apertures 24, 26, 28, and 30. The apertures 24, 26, 28, and 30 pass though the body 10 from the top surface 22 to the abutment surfaces 14A and 14B. The apertures 24, 26, 28, and 30 are arranged to accommodate bolts or other such fasteners. The body 12 also includes a number of weight reducing features. For example, a weight reducing recess 32 extending into the body 12 from the top surface 22, and a plurality of weight reducing recesses 34, 36, 38, and 40 extending into the body 12 from the side surfaces 18 and 20. As illustrated, the recesses 32, 34, 36, 38, and 40 are areas that are lower than the surrounding surfaces 18, 20, and 22 due to the elimination of material that would normally be present to complete an even exterior surface. The elimination of material from exterior surfaces of the bearing cap 10 allows for a multitude of embodiments for the reduction of overall weight of the bearing cap 10 without compromising the structural integrity of the bearing cap 10.

The bearing cap 10 is designed to be coupled to the engine, either directly or indirectly. Bolts or other such fasteners are passed through the apertures 24, 26, 28, and 30 and fastened in threaded holes (not shown) in an engine. Alternatively, the bolts may be fastened to an intermediate component, which is secured to the engine, to couple the bearing cap 10 to the engine. When the bearing cap 10 is coupled to the engine, the bearing cap 10 abuts or otherwise contacts the engine or intermediate component along the abutment surfaces 14A and 14B. The abutment surfaces 14A and 14B are flat and coplanar, such that the surfaces 14A and 14B may effectively contact opposing surfaces on the engine or intermediate component. The bearing surface 16 is arranged to capture a balance shaft (not shown) when the bearing cap 10 is coupled to the engine. The bearing surface 16 cooperates with a similar bearing surface on the engine or other intermediate component to form a bearing to contain a journal portion of the balance shaft and secure the balance shaft to the engine. Coupled as used herein is defined as connected, either directly or indirectly. Two components that are coupled, may have one or more intermediate components that are used to connect the components together.

As previously described, the body 12 includes a number of recesses 32, 34, 36, 38, and 40 to reduce the weight of the bearing cap 10. Preferably, the recesses 32, 34, 36, 38, and 40 are arranged to offer the maximum reduction of weight without affecting the structural integrity of the bearing cap 10, which is needed to secure balance shafts to the engine. Although the preference is to achieve a maximum reduction of bearing cap weight, any reduction of weight through the weight reduction features as described herein is included in the present invention.

The exemplary embodiment as illustrated includes a recess 32 in the top surface 22. The recess 32 is a groove or channel located along an end 42 of the top surface 22. Although the recess 32 in the top surface 22 is illustrated and described as a groove or channel along an end 42 of the top surface 22, it will be understood by those skilled in the art that a recess of any size or shape that extends into the body 12 from the top surface 22 is included in the present invention. Indeed, the invention is not limited to one recess or weight reduction feature on the top surface 22, any number of recesses or other weight reduction features may be incorporated into the top surface 22, provided the structural integrity of the bearing cap 10 is not compromised.

The exemplary embodiment as illustrated, includes four recesses 34, 36, 38, and 40 in the side surfaces 18 and 20. Each recess 34, 36, 38, and 40 is an elongated channel extending from the intersections of the top surface 22 and the side surfaces 18 and 20 towards the abutment surfaces 14A and 14B and terminating a short distance from the abutment surfaces 14A and 14B. Each recess 34, 36, 38, and 40 in the side surfaces 18 and 20, includes a ledge 44 at the end of the channel 34, 36, 38, and 40 that terminates proximate to the abutment surfaces 14A and 14B. Each ledge 44 is generally perpendicular to the side surfaces 18 and 20. The purpose for terminating the channels 34, 36, 38, and 40 a short distance from the abutment surfaces 14A and 14B is to maintain a maximum footprint or profile for the abutment surfaces 14A and 14B. If a channel 34, 36, 38, and 40 were to extend to the intersection between the side surfaces 18 and 20 and an abutment surface 14A and 14B, the surface area of the abutment surface 14A and 14B would be reduced. Such reduction in surface area may enhance contact fatigue between the abutment surface 14A and 14B and a mating surface on the engine, which may lead to premature failure of the bearing cap 10.

As best seen in FIGS. 1 and 3, each elongated channel 34, 36, 38, and 40 in a side surface 18, 20 is located between a pair of apertures 24, 26 and 28, 30. When a recess in a side surface 18 and 20 is an elongated channel 34, 36, 38, and 40, locating the channel 34, 36, 38, and 40 between a pair of apertures 24, 26 and 28, 30 is preferred. Such a location does not affect the structural integrity of the bearing cap 10. Each channel 34, 36, 38, and 40 is arranged such that the amount of material surrounding the perimeter of each aperture 24, 26, 28, and 30 is as large or larger than the amount of material surrounding the perimeter of each aperture 24, 26, 28, and 30 when a weight reducing feature is not located near an aperture. Therefore, whether a weight reducing feature is located near an aperture or not, the structural integrity of the bearing cap 10, specifically the area surrounding apertures, is unaffected.

Although the recesses 34, 36, 38, and 40 in the side surfaces 18 and 20 are illustrated and described as channels extending from the top surface 22 to a short distance from the abutment surfaces 14A and 14B, it will be understood by those skilled in the art that a recess or other weight reduction feature of any shape or size that extends from a side surfaces 18 and 20 into the body is included in the present invention. Indeed, the invention is not limited to the four recesses 34, 36, 38, and 40 shown on the side surfaces 18, 20, any number of recesses or other weight reduction features may be positioned on the side surfaces 18, 20, provided the structural integrity of the bearing cap 10 is not compromised.

Bearing caps as described herein may be formed or manufactured through a molding process that utilizes a mold and a die. The mold typically includes a cavity that generally defines the shape of the bearing cap. Material is placed into the cavity through an open end of the cavity. The die, which includes a contact surface that defines one exterior surface of the bearing cap, enters the cavity though the open end and compresses the material in the cavity to form the bearing cap. A common material used to mold bearing caps is a powder metal material. Such powder metal can be placed into the cavity, the die can enter the cavity to compress the powder metal, and the powder metal can be sintered upon compression of the material to form a solid bearing cap. Such a process may produce a near-net-shape part, i.e., a part that needs little or no machining to achieve a final form.

Typically, a bearing cap is molded with the cavity forming the abutment surfaces 14A and 14B, the bearing surface 16, and the side surfaces 16 and 18. The contact surface of the die forms the top surface 22. That is to say, bearing caps are normally molded in the upright position, with reference to FIG. 1. However, with the embodiment shown in the figures, the bearing cap would not be able to be removed from the cavity of a standard mold. Each channel 34, 36, 38, and 40 includes a ledge 44 formed just above the abutment surfaces 14A and 14B. The outer dimensions of the abutment surfaces 14A and 14B are larger than the outer dimensions of the channels 34, 36, 38, and 40. Thus, the exemplary bearing cap 10, as illustrated in the figures, cannot be manufactured in the upright position. As such, the exemplary bearing cap 10 may be manufactured in a reversed, or upside down position, with reference to FIG. 1. In this arrangement the cavity forms the side surfaces 18 and 20, any weight reduction features in the side surfaces 18 and 20, the top surface 22, and any weight reduction features in the top surface 22. The contact surface of the die forms the abutment surfaces 14A and 14B and the bearing surface 16. The arrangement of the contact surface of the die, along with the alignment of the die is such that the abutment surfaces 14A and 14B are coplanar and generally flat upon the forming of the bearing cap 10.

Molding the bearing cap in a reversed position provides flexibility in designing and molding weight reduction features into bearing caps. As most designs that include weight reducing features will seek to maintain the largest possible footprint or profile for the abutment surfaces, the outer dimensions of the side surfaces and top surface will typically be less than the outer dimensions of the abutment surfaces footprint. Therefore, molding the bearing cap in the reversed position may reduce concerns over removal of the bearing cap from the cavity once the bearing cap is formed. Weight reduction features, such as channels and groove, can be formed by including protrusions on an inner wall of the cavity. Such protrusions reduce the amount of material needed to mold a bearing cap, and thus, reduce the overall weight of the bearing cap.

An alternative to molding a bearing cap in a reversed position is to utilize a split mold, which includes two halves. In such an arrangement, the bearing cap can be molded in either the upright or reversed positioned. Once the bearing cap is formed, the two halves of the mold can be separated to remove the formed bearing cap.

Figure 6:
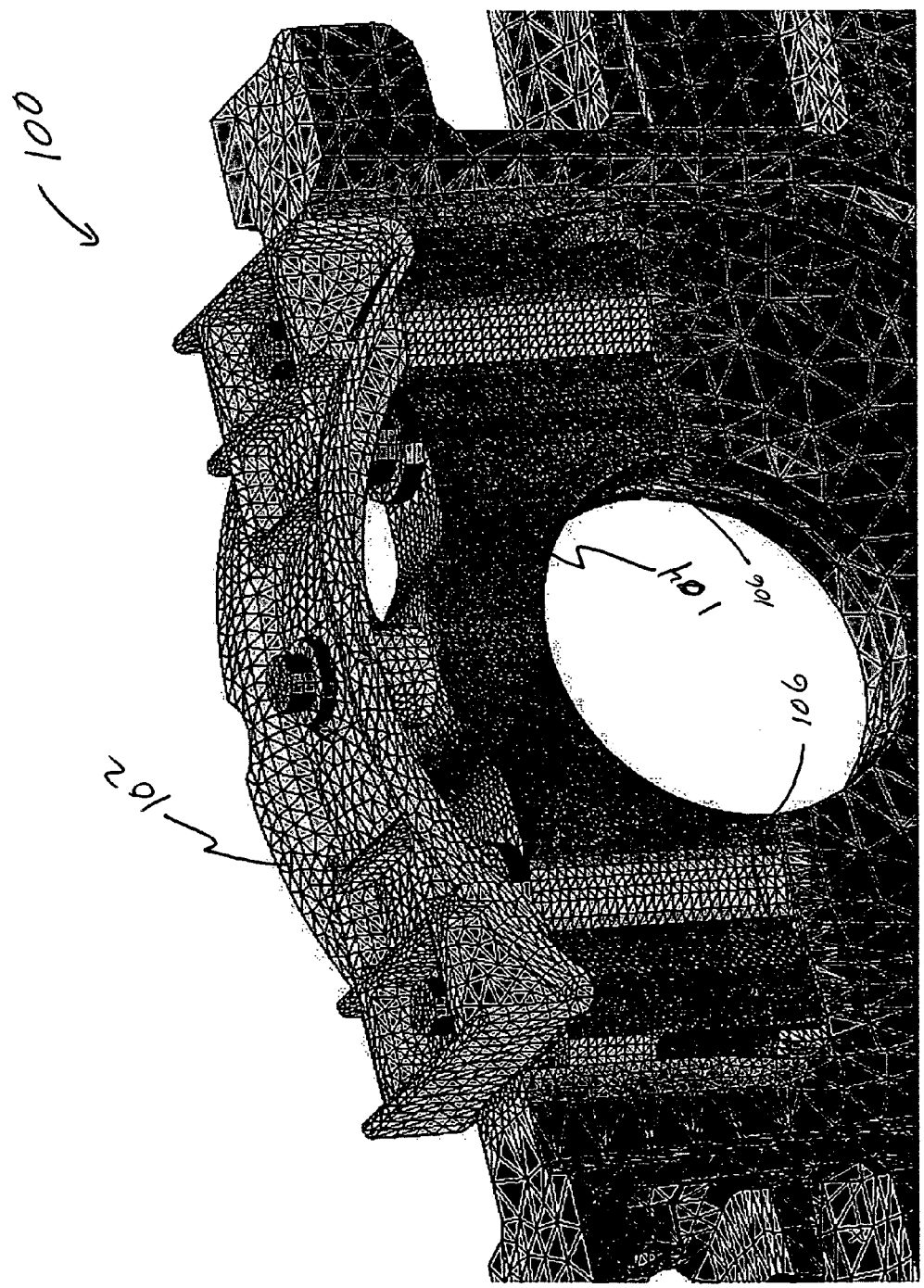
FIG. 6 is a perspective view of a bearing cap arranged in accordance with another embodiment of the present invention.

Referring to FIG. 6, another exemplary bearing cap 100 in accordance with an embodiment of the invention is illustrated. The bearing cap 100 includes a rigid frame 102 coupled to a sintered bearing cap body 104. The bearing cap body 104 includes weight reduction features 106. For example, the bearing cap body 104 may include channels or grooves as described herein.

Having thus described the invention, I claim:

1. A bearing cap comprising:
   a body comprising:
      an abutment surface for coupling said bearing cap to an engine;
      a bearing surface capable of at least partially capturing a balance shaft when said bearing cap abuts said engine;
      a first exterior surface;
      a top surface;
      a first aperture and second aperture positioned on a first side of said bearing surface, said first and second apertures extending from said top surface through said abutment surface; and
      a first recess extending into said first exterior surface between said first and second apertures to provide weight reduction to said bearing cap;
   wherein a portion said abutment surface forms a ledge between said first and second apertures.

2. The bearing cap of claim 1 wherein said top surface is arranged generally opposite to said abutment surface.

3. The bearing cap of claim 1 wherein said first exterior surface is arranged generally perpendicular to and adjacent to said abutment surface.

4. The bearing cap of claim 3 wherein said first recess is an elongated channel.

5. The bearing cap of claim 4 wherein
   said elongated channel comprises:
      a first end located proximate to and spaced apart from said abutment surface; and
      a second end terminating at said top surface.

6. The bearing cap of claim 1 wherein said first recess is centrally located between said first and second apertures.

7. The bearing cap of claim 1 wherein the body further comprises:
   a second exterior surface arranged opposite and generally parallel to said first exterior surface; and
   a second recess extending into said second exterior surface to further provide weight reduction to said bearing cap.

8. The bearing cap of claim 7 wherein said second recess is an elongated channel that is located between said first and second apertures.

9. The bearing cap of claim 8 wherein said second recess is arranged opposite to said first recess.

10. The bearing cap of claim 8 wherein the bearing cap maintains structural integrity to secure said balance shaft to said engine.

* * * * *

UNITED STATES PATENT AND TRADEMARK OFFICE
CERTIFICATE OF CORRECTION

| | | |
|---|---|---|
| PATENT NO. | : 7,753,592 B2 | Page 1 of 1 |
| APPLICATION NO. | : 11/520322 | |
| DATED | : July 13, 2010 | |
| INVENTOR(S) | : Neto | |

It is certified that error appears in the above-identified patent and that said Letters Patent is hereby corrected as shown below:

Title page Item (65)

Column 1, Related Applications, delete "RESUCTION" and insert --REDUCTION--

Signed and Sealed this

Thirty-first Day of May, 2011

David J. Kappos
*Director of the United States Patent and Trademark Office*